(12) United States Patent
Murase et al.

(10) Patent No.: US 8,287,758 B2
(45) Date of Patent: Oct. 16, 2012

(54) SEMICONDUCTOR ULTRAFINE PARTICLES, FLUORESCENT MATERIAL, AND LIGHT-EMITTING DEVICE

(75) Inventors: Norio Murase, Ikeda (JP); Chunliang Li, Ikeda (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 1579 days.

(21) Appl. No.: 10/543,185

(22) PCT Filed: Jan. 23, 2004

(86) PCT No.: PCT/JP2004/000585
§ 371 (c)(1),
(2), (4) Date: Mar. 23, 2006

(87) PCT Pub. No.: WO2004/065296
PCT Pub. Date: Aug. 5, 2004

(65) Prior Publication Data
US 2007/0075294 A1    Apr. 5, 2007

(30) Foreign Application Priority Data

Jan. 24, 2003  (JP) ................................. 2003-015490
Nov. 21, 2003  (JP) ................................. 2003-391685

(51) Int. Cl.
C09K 11/02 (2006.01)
C09K 11/54 (2006.01)
C09K 11/56 (2006.01)
C09K 11/70 (2006.01)
C09K 11/72 (2006.01)
C09K 11/77 (2006.01)

(52) U.S. Cl. ....... 252/301.36; 252/301.6 R; 252/301.6 S
(58) Field of Classification Search ............ 252/301.36, 252/301.6 R, 301.6 S
See application file for complete search history.

(56) References Cited

U.S. PATENT DOCUMENTS 7,226,953 B1 * 6/2007 Petruska et al. ................ 516/98
2002/0110180 A1 * 8/2002 Barney et al. .................. 374/161

FOREIGN PATENT DOCUMENTS

JP    2002-211935    7/2002

OTHER PUBLICATIONS

Chan. Luminescent quantum dots for multiplexed biological detection and imaging. Current Opinion in Biotechnology 2002 13:40-46.*
Selvan. "Synthesis of tunable, highly, luminescent QD-glasses through sol-gel processing" Adv. Mater. 2001, 13 No. 12-13 984-988.*
Seddon. CdSe Quantum Dot Doped Amine-Functionalized Ormosils. Journal of Sol-Gel Science and Technology 13, 623-628 (1998).*
Li. Fabrication of highly luminescent glass incorporating CdTe nanocrystals by using silane coupling agents. Physica Status Solidi. (c) 0 No. 4 1250-1253 (2003).*
The Journal of Physical Chemistry B, vol. 102, No. 43, Oct. 22, 1998, pp. 8360-8363.
The Journal of Physical Chemistry B, vol. 106, No. 29, Jul. 25, 2002, pp. 7177-7185.
The Journal of Physical Chemistry B, vol. 101, No. 46, Nov. 13, 1997, pp. 9462-9475.
Advanced Materials, vol. 12, No. 15, Aug. 2, 2000, pp. 1102-1105.
Advanced Materials, vol. 13, No. 12-13, Jul. 4, 2001, pp. 985-988.
The Journal of Physicial Chemistry, vol. 72, No. 9, Sep. 1968, pp. 3250-3261.
The Journal of Physical Chemistry, vol. 97, No. 43, Oct. 28, 1993, pp. 11998-12003.
J. American Chemical Society, vol. 124, No. 20, May 22, 2002, pp. 5782-5790.
Chunliang Li et al., "Synthesis of Highly Luminescent Glasses Incorporating CdTe Nanocrystals through Sol-Gel Processing", *Langmuir (The ACS Journal of Surfaces and Colloids)*, Jan. 6, 2004, vol. 20, No. 1, pp. 1-4.

* cited by examiner

*Primary Examiner* — Carol M Koslow
*Assistant Examiner* — Matthew Hoban
(74) *Attorney, Agent, or Firm* — Kratz, Quintos & Hanson, LLP

(57) ABSTRACT

The present invention provides a novel fluorescent material which has a luminance higher than that of the conventional rare earth ion-dispersed fluorescent materials and is excellent in light resistance and long-term stability, and also an optical device, such as a high-luminance display panel or lighting equipment, which uses such a fluorescent material. Semiconductor ultrafine particles are characterized by maintaining 50% or more fluorescence quantum yield of photoluminescence when they are kept dispersed in water at 10° C. to 20° C. in air for 5 days. The fluorescent material is obtained by dispersing such semiconductor ultrafine particles in a glass matrix using a sol-gel process.

8 Claims, 5 Drawing Sheets

SEMICONDUCTOR ULTRAFINE PARTICLES, FLUORESCENT MATERIAL, AND LIGHT-EMITTING DEVICE

TECHNICAL FIELD

The present invention relates to semiconductor ultrafine particles, a fluorescent material, and a manufacturing process therefor, and a lighting device and display device using the fluorescent material.

BACKGROUND OF THE INVENTION

In the ongoing information technology revolution, display elements and assemblies thereof, i.e., monitors such as displays, play an important role as interfaces between people and various types of equipment. Such display elements are faced with continuous demands for higher brightness and higher resolution, and must also be as thin and lightweight as possible. Fluorescent materials with high fluorescence quantum yield and brightness are indispensable for meeting such requirements. Moreover, such fluorescent materials are also used in a wide variety of applications for lighting materials. Therefore, research has been conducted to develop such fluorescent materials for about 100 years, starting in the beginning of the $20^{th}$ century.

Dyes and metal ions have long been known as fluorescent materials. As fluorescent materials for use in display elements and lighting devices, inorganic matrices in which metal ions, particularly rare earth ions or transition metal ions, are dispersed have so far been used. These fluorescent materials have been researched extensively and are being constantly improved because rare earth ions and transition metal ions change little over time and are degraded only minimally by light irradiation in comparison with organic Dyes. However, the transition of such rare earth ions and transition metal ions is a forbidden transition type in many cases, and hence their emission lifetime is about 1 ms (millisecond). Accordingly, even when such ions are irradiated with intense excitation light in an attempt to achieve higher brightness, such ions fail to rapidly convert this light to the desired emitting light, and the phenomenon referred to as brightness saturation occurs. This phenomenon is a major obstacle to achieving higher brightness through the use of rare earth ions or transition metal ions. Moreover, it is generally necessary to vary the excitation wavelength according to the wavelength of the emitted light.

For the last ten years, research has progressed on the fluorescence properties of materials obtained by doping the above-described transition metal ions or rare-earth ions into ultrafine particles. However, the emission lifetime of the ions doped in the ultrafine particles is not different from that of ions doped in a bulk matrix. Therefore, these materials are regarded as an extension of the above-described conventional fluorescent materials.

In recent years, attention has been drawn to the discovery that surface-treated semiconductor ultrafine particles (in which transition metal ions or rare earth ions are not doped) emit light with high efficiency. Typical examples of semiconductor ultrafine particles are particles of Group II-VI compounds whose diameters are on the order of several nm. These particles display so-called quantum size effects, with smaller particles having a wider band gap. For this reason, such particles can emit various colors depending on the particle size even when all are irradiated with ultraviolet light of the same wavelength, with smaller particles emitting shorter wavelengths of light. For example, when irradiated with ultraviolet light, cadmium selenide emits blue light when in the form of particles with a diameter of about 2 nm, and red light when in the form of particles with a diameter of about 5 nm. The emission lifetime of these semiconductor ultrafine particles is about 10 ns (nanosecond). For this reason, excitation light can be converted to the necessary light at a speed five orders of magnitude more rapidly than with a fluorescent material based on rare earth ions or transition metal ions, and the excitation light can be reabsorbed and emitted, making it possible to ensure extremely high brightness. Another advantage is the ability to promptly follow the ON and OFF cycles of excitation light.

It should be noted, however, that such semiconductor ultrafine particles have a large specific surface area because of their small particle size, which makes it important to reduce the number of surface defects by a surface treatment to suppress radiationless deactivation in order to raise the fluorescence quantum yield. Sulfur-containing compounds can suitably be used for such surface treatment. Typical examples include thiols and other organic surfactants, as well as zinc sulfide. Since semiconductor ultrafine particles whose surface is thoroughly coated using such compounds are incredibly bright, it has been shown in the latest research that emission from each individual particle can be separately detected and spectroscopically resolved. This can be regarded as an excellent characteristic unattainable with a rare earth or transition metal fluorescent material. Another significant advantage of semiconductor ultrafine particles is that various colors can be emitted in accordance with the particle size by irradiating the particles with light whose single wavelength is shorter, that is, has higher energy, than the band gap. In other words, the advantage of such fluorescent materials is that the excitation wavelength can be suitably selected and that even when the same material is used, emission with the desired wavelength can be obtained by varying the particle size.

Such semiconductor ultrafine particles are currently produced by a colloidal method. There are two types of particles: those that are produced in an aqueous solution, and those that are produced in a nonaqueous solution.

A typical example of such ultrafine particles produced in an aqueous solution is cadmium telluride, which has a fluorescence quantum yield of several percent (Gao, et al., *Journal of Physical Chemistry*, B, vol. 102, p. 8360 (1998)). Ultrafine particles produced by this procedure are dispersed in water and are stable for a while, however, they are inferior in the fluorescence quantum yield to the ultrafine particles produced in a non-aqueous solvent described below.

In contrast, it was recently reported that ultrafine particles produced by an aqueous solution method were subjected, after the formation of ultrafine particles, to a process of decreasing the pH of the solution or to a process of etching the particles by irradiating them with light, thereby manufacturing ultrafine particles with a fluorescence quantum yield of about 40% (Gaponik et al., *Journal of Physical Chemistry*, B, vol. 106, p. 7177 (2002)). However, ultrafine particles produced in a pH-reduced solution are unstable, and fluorescence quantum yield decreases to half or less in air in about 7 days. Since etching ultrafine particles by irradiation with light requires about five days and the particle size distribution of the produced particles expands, the width of the emission spectrum also adversely enlarges.

A process by which ultrafine particles are produced using organometallic pyrolysis is known for producing such fluorescent materials in a nonaqueous solution (Bawendi, et al., *Journal of Physical Chemistry*, B, vol. 101, p. 9463 (1997)). This method is advantageous in that, for example, a quantum yield in excess of 20% can be obtained with ultrafine particles of cadmium selenide, and although the resulting ultrafine particles themselves are insoluble in water, coating the surface with ionic organic molecules makes the particles soluble in water so they can be handled in the same way as the previously described cadmium telluride particles obtained from an aqueous solution. However, this method disadvantageously requires expensive and complicated experimental equipment, and special considerations to ensure safety. Another drawback is that in most cases ultrafine particles thus produced remain stable in water for only about a few hours. Therefore, these drawbacks are major factors impeding the practical application of particles produced in a nonaqueous solvent.

Thus, surface-coated semiconductor ultrafine particles emit extremely bright light but cannot easily be kept stable in an aqueous solution. Ultrafine particles of cadmium telluride obtained by an aqueous solution method usually aggregate and precipitate in about five days in air at room temperature. For this reason, the emission performance is lost.

For the above reasons, conventional semiconductor ultrafine particles lack practicality as an engineering material because the particles in the form of a solution cannot maintain their fluorescence quantum yield at room temperature in air for a long time, even if the particles originally emit extremely bright light.

Several attempts have therefore been made to support and stabilize such surface-coated semiconductor ultrafine particles in a solid matrix. There is, for example, a report concerning a method for fixing such particles in an organic polymer (Bawendi, et al., *Advanced Materials*, vol. 12, p. 1102 (2000)). However, polymers used as a matrix have low levels of light resistance, heat resistance, and other properties, and gradually permit the passage of water and oxygen. The resulting drawback is a gradual degradation of the ultrafine particles thus fixed. In addition, in a mixture of ultrafine particles as an inorganic material and a polymer as an organic material, the ultrafine particles are apt to aggregate if the dispersion concentration of the ultrafine particles is high, and therefore the fluorescent material tends to have inferior characteristics as a light-emitting material.

To overcome the drawbacks of such polymer matrices, an attempt has been made to disperse ultrafine particles in a glass matrix by a sol-gel process using tetraalkoxysilane (Selvan, et al., *Advanced Materials*, vol. 13, p. 985 (2001)). In this method, however, the ultrafine particles are insoluble in water, so usable sol-gel processes are limited and only gelled products can be obtained. In addition, the fluorescence quantum yield in this case is reported to be about 10% at the maximum.

DISCLOSURE OF THE INVENTION

The present invention was made in view of the problems of the prior art, and the principal object is to provide a novel fluorescent material that has better brightness than conventional fluorescent materials using dispersed rare earth ions, transition metal ions, or the like, that possesses excellent light resistance, temporal stability, and the like.

It is another object of the present invention to provide a light-emitting device such as a high-brightness display device or lighting device using such a fluorescent material.

The inventors conducted extensive research to attain the above-described objects and found the following. In the production process of semiconductor ultrafine particles from an aqueous solution, the amount of surfactant to be used, the purity of the water, and other conditions could be appropriately determined, thereby obtaining novel semiconductor ultrafine particles with a favorable water dispersibility and a high fluorescence quantum yield that can be maintained for a long period of time even in a solution containing water in air. The inventors also found that the semiconductor ultrafine particles thus obtained can maintain good dispersibility and fluorescence performance while glass is formed from a metal alkoxide when the particles are dispersed in a glass matrix using a sol-gel method, yielding a fluorescent material with outstanding performance. The present invention has been accomplished based on the above findings.

More specifically, the invention provides the following semiconductor ultrafine particles, fluorescent materials, manufacturing processes therefor, and lighting devices and display devices using the fluorescent material.

Item 1. Semiconductor ultrafine particles, which maintain 50% or more fluorescence quantum yield of photoluminescence when the particles are kept dispersed in water at 10° C. to 20° C. in air for five days.

Item 2. Semiconductor ultrafine particles according to Item 1, wherein the particles belong to Group II-VI semiconductor ultrafine particles.

Item 3. Semiconductor ultrafine particles according to Item 2, wherein the fluorescence quantum yield is measured when they are dispersed in an aqueous solution having a pH of 10 to 12 comprising a water-soluble compound containing a Group II element (about 0.001 to about 0.05 mol/L) as a starting material of the semiconductor ultrafine particles of Group II-VI and a surfactant (about 1 to 1.5 mol per mol of the Group II element contained in the aqueous solution).

Item 4. Semiconductor ultrafine particles according to Item 2, wherein the particles are cadmium telluride.

Item 5. A fluorescent material which is obtained by dispersing semiconductor ultrafine particles according to any one of Items 1 to 4 in a glass matrix formed by a sol-gel process.

Item 6. A fluorescent material wherein semiconductor ultrafine particles with 20% or more fluorescence quantum yield of photoluminescence are dispersed in a glass matrix formed by a sol-gel process.

Item 7. A fluorescent material according to Item 6, wherein a concentration of semiconductor ultrafine particles in the glass matrix is $2\times10^{-6}$ to $2\times10^{-4}$ mol/L.

Item 8. A fluorescent material according to any one of Items 5 to 7, wherein the glass matrix is formed by a sol-gel process using an organoalkoxysilane as a starting material.

Item 9. A fluorescent material according to any one of claims 5 to 8, wherein semiconductor ultrafine particles are dispersed in the glass matrix, the particles having a fluorescence quantum yield of photoluminescence which is decreased by 20% or less when the fluorescent material is left at room temperature in air for eight months.

Item 10. A method for manufacturing semiconduct or ultrafine particles according to any one of Items 2 to 4;
the method comprising introducing a compound containing a Group VI element under an inert atmosphere into an aqueous alkaline solution in which a water-soluble compound containing a Group II element and a surfactant are dissolved; wherein
the amount of surfactant is about 1 to about 1.5 mol per 1 mol of the Group II element; and
ultrapure water in which the specific resistance is 18 MΩ·cm or more and the total amount of organic compound (TOC) contained therein is 5 ppb or less is used as a solvent.

Item 11. A method of manufacturing a fluorescent material according to any one of Items 5 to 9, the method comprising adding a dispersion solution of semiconductor ultrafine particles according to any one of Items 1 to 4 to a sol solution containing a metal alkoxide, to cause hydrolysis and condensation polymerization, thereby forming a glass matrix.

Item 12. A method of manufacturing a fluorescent material according to Item 11, the method comprising adding a dispersion of semiconductor ultrafine particles according to any one of Items 1 to 4 to a sol solution containing a metal alkoxide, to cause hydrolysis and condensation polymerization, thereby forming a glass matrix; wherein the dispersion of the semiconductor ultrafine particles is added when the viscosity of the sol solution containing a metal alkoxide reaches 300 centipoises to 3000 centipoises.

Item 13. A light emitting device comprising:

a light emitter composed of a fluorescent material according to any one of Items 5 to 9; and a light source which emits excitation light with a wavelength of 320 nm to 600 nm for exciting the fluorescent material.

DETAILED DESCRIPTION OF THE INVENTION

Figure 1:
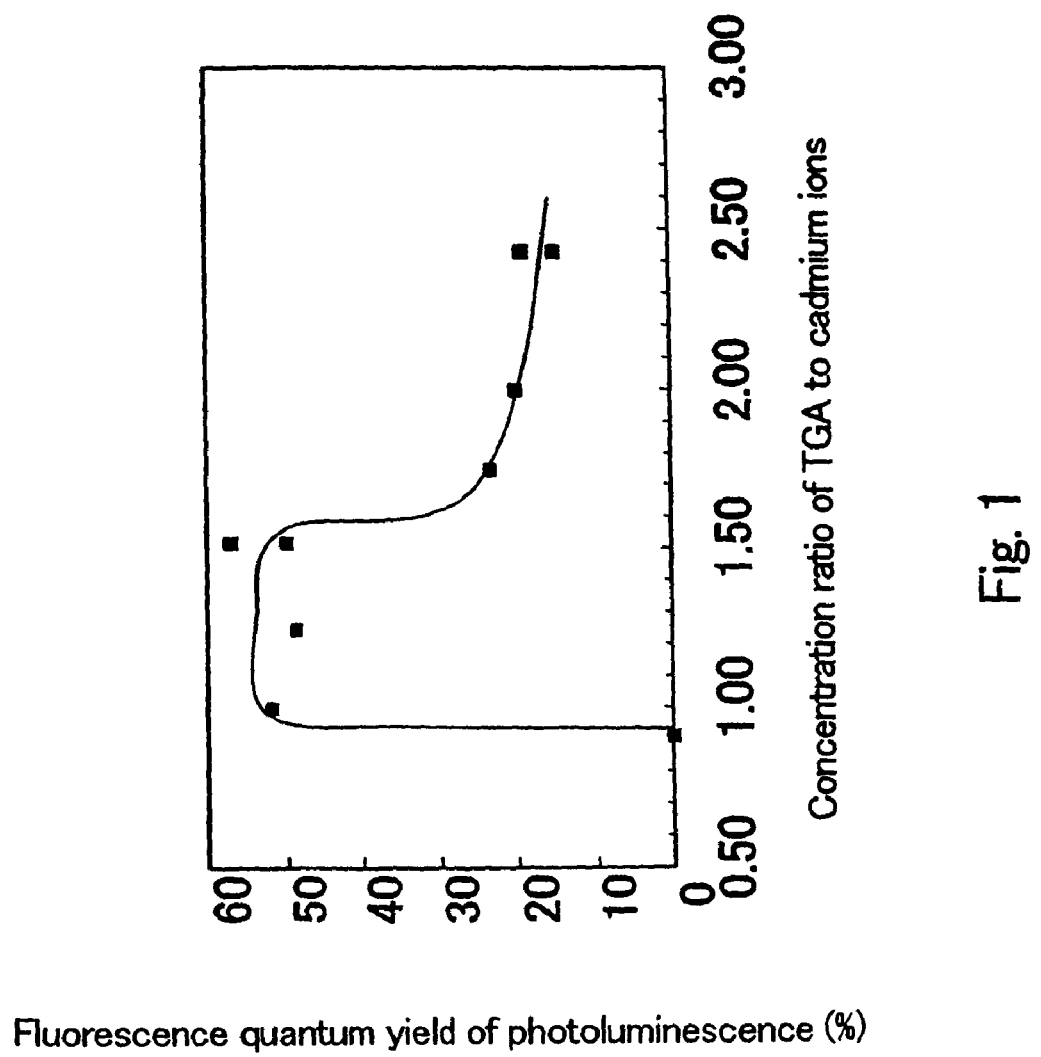
FIG. 1 is a graph showing the relation between the concentration ratio of thioglycolic acid (TGA) to cadmium ions and the fluorescence quantum yield of photoluminescence of a ultrafine particle dispersion using the semiconductor ultrafine particles obtained in Example 1.

Hereinafter, the semiconductor ultrafine particles of the invention, a fluorescent material using the ultrafine particles, and the use thereof are described.
Semiconductor Ultrafine Particles The semiconductor ultrafine particles of the invention can maintain 50% or more fluorescence quantum yield of photoluminescence when they are kept dispersed in water at 10° C. to 20° C. for five days in air.

The use of the semiconductor ultrafine particles can increase the fluorescence quantum yield when the particles are dispersed in a glass matrix by a procedure, that will be described later. The semiconductor ultrafine particles with such characteristics are novel and cannot be obtained by conventional manufacturing methods. Moreover, the particles are stable in a water-containing solution for a long period of time. This allows the semiconductor ultrafine particles of the invention to be dispersed and supported at high concentration in a glass formed by a sol-gel process, thereby providing a fluorescent material which has high fluorescence quantum yield and is excellent in mechanical properties, heat-resistant properties, chemical stability, etc.

The term "fluorescence quantum yield of the photoluminescence of semiconductor ultrafine particles" used herein is defined as a ratio ($\Phi_{PL}/\Phi_A$) of the number of photons ($\Phi_{PL}$) emitted as photoluminescence to the number of photons ($\Phi_A$) absorbed.

The fluorescence quantum yield is a value normally used in this technical field, and is synonymous with the term "internal quantum yield". The fluorescence quantum yield is determined by using a dye molecule, whose fluorescence quantum yield is known, and comparing the absorbance and the fluorescence quantum yield of the dye molecule solution and a measurement target at an excitation light wavelength. During the measurement, the absorbances of the dye molecule solution and the measurement target at the same excitation wavelength are made to be identical for comparison by a known method (e.g., Dawson, et al., *Journal of Physical Chemistry*, vol. 72, p. 3251 (1968)). The term "fluorescence quantum yield of photoluminescence" may also be referred to as "fluorescence quantum yield" in this specification.

In the invention, semiconductor ultrafine particles can belong to the Group II-VI semiconductor ultrafine particles that undergo direct transition and emit light in the visible range. Examples thereof include cadmium sulfide, zinc selenide, cadmium selenide, zinc telluride, and cadmium telluride.

Among such semiconductor ultrafine particles, those that can maintain 50% or more fluorescence quantum yield of photoluminescence when they are kept dispersed in water at 10° C. to 20° C. for five days in air, as described above, can be manufactured by, for example, the following process.

More specifically, one or more Group-VI element compounds are introduced into an alkaline aqueous solution under an inert atmosphere in which a water-soluble compound containing a Group-II element and a surfactant are dissolved, thereby obtaining Group II-VI semiconductors. A Group-VI element compound can also be used in the form of gas.

In this process, preferable as a water-soluble compound containing a Group II element is perchlorate. For example, cadmium perchlorate can be used when the Group II element is cadmium. Surfactants comprising a thiol group, which is a hydrophobic group, and a hydrophilic group are preferable. Usable as hydrophilic groups are anionic groups, such as a carboxyl group and the like, cationic groups, such as an amino group and the like, hydroxyl groups, etc., and in particular anionic groups, such as a carboxyl group and the like are preferable. Specific examples of surfactants include thioglycolic acid, thioglycerol, mercaptoethylamine, etc.

As a Group VI element compound, group VI element hydrides, etc., are usable, and for example, a hydrogen telluride can be used when the Group VI element is tellurium. Alternatively, a hydrogen telluride is allowed to react with sodium hydroxide to yield sodium hydrogen telluride, which can be introduced in a state of an aqueous solution.

In the invention, ultrafine particles sufficiently imparted with the above-described properties can be obtained by adjusting the amount of surfactant used for manufacturing the ultrafine particles within the range of about 1 to about 1.5 mols per mol of Group II element(s) contained in the aqueous solution. This amount of surfactant is considerably small as compared with that used in the conventional process for manufacturing ultrafine particles from an aqueous solution (2.43 mols per mol of Group-II element). However, in the invention, the use of a surfactant in an amount within the above-specified range provides ultrafine particles with higher fluorescence quantum yield than that of the conventional semiconductor ultrafine particles.

The amount of surfactant exceeding the above-mentioned range tends to decrease the fluorescence quantum yield of the ultrafine particles obtained because the large amount of surfactants adsorbed on the surface of the ultrafine particles can possibly increase the number of defects appearing on the surface of the ultrafine particles. In contrast, the excessively small amount thereof compared with the above-mentioned range also decreases the fluorescence quantum yield because the ultrafine particles easily agglomerate due to the extremely small amount of surfactant.

In the invention, high-purity water is used for producing ultrafine particles. It is appropriate to use ultrapure water in which the specific resistance is 18 MΩ·cm or more and the total amount of organic compound (TOC) in the water is 5 ppb or less, preferably 3 ppb or less. A reaction container, etc., is sufficiently washed using such high-purity water and the high-purity water is used as a reaction solvent, thereby obtaining semiconductor ultrafine particles with excellent luminescent performance.

There is no limitation to the concentration of the water-soluble compound containing a Group II element in an aqueous solution during the production of semiconductor ultrafine particles. However, extremely low concentration may impair the reaction efficiency, and, on the other hand, excessively high concentration may cause precipitation. Accordingly, the concentration is preferably within the range of about 0.001 to about 0.05 mol/L, preferably about 0.01 to about 0.02 mol/L, and more preferably about 0.013 to 0.018 mol/L.

The amount of Group VI element compound is not limited, and is generally about 0.3 to about 1.5 mols of Group VI ion per mol of Group II ion, and is preferably about 0.4 to about 0.9 mols of Group IV ion per mol of Group II ion.

The above-described reaction can be carried out by bubbling, under an inert atmosphere, a gaseous Group VI element compound in an aqueous solution in which a water-soluble compound containing a Group II element and a surfactant are dissolved, or by allowing a gaseous Group VI compound to react with a sodium-hydroxide solution to yield an aqueous solution, and injecting it using a syringe or the like into an aqueous solution in which a water-soluble compound containing a Group II element and a surfactant are dissolved.

There is no limitation to the inert gas insofar as the gas does not affect the reaction. Preferable examples of the inert gas include argon gas, nitrogen gas, helium gas, and the like.

The above-described reaction can be usually performed at room temperature (for example, about 10° C. to about 30° C.). The pH of the aqueous solution is preferably about 10 to about 12, more preferably 10.5 to 11.5. The reaction is usually complete with in about 10 minutes after the introduction of the Group VI compound.

The dispersion of semiconductor ultrafine particles is produced by the above-described process. The concentration of ultrafine particles in the produced dispersion liquid is suitably determined according to the reaction condition, and is usually within the range of $1 \times 10^{-6}$ mol/L to $1.5 \times 10^{-7}$ mol/L, preferably about $2 \times 10^{-6}$ mol/L to about $1.0 \times 10^{-7}$ mol/L, and more preferably about $3 \times 10^{-6}$ mol/L.

The diameter of the ultrafine semiconductor particles obtained by the above-described process is generally on the order of nanometers.

Semiconductor ultrafine particles manufactured by the above-described process are subjected to reflux, thereby controlling the particle size thereof. The particle size can be enlarged by increasing the reflux time.

The particle size determines the emitted color of the semiconductor ultrafine particles, and particles with smaller sizes emit shorter wavelengths of light. In general, the particle size of the semiconductor ultrafine particles is preferably about 2 to about 10 nm.

To obtain ultrafine particles that emit monochromatic light, the reflux time should be kept constant and the synthesis process adjusted so that the standard deviation of the size distribution is 20% or less, and preferably 15% or less of the mean particle size. It is unsuitable for the standard deviation of the size distribution to exceed 20% because in this case various types of light mix with each other, and it becomes difficult to obtain the color tone required for the display material.

The thus-obtained dispersion of semiconductor ultrafine particles usually contains, besides the target semiconductor ultrafine particles, a Group II element ion used as a starting material, a surfactant, a fine cluster less than 1 nanometer, etc. By using this dispersion of semiconductor ultrafine particles, the ultrafine particles as such are distributed in a glass matrix, to thereby yield a fluorescent material according to the process described later.

The ultrafine particles contained in the dispersion are separated in terms of their approximate particle size, to thereby obtain ultrafine particles with a narrow particle size range. Using a dispersion in which the ultrafine particles are re-dispersed in water, the semiconductor ultrafine particles are dispersed and immobilized in a glass matrix, providing a fluorescent material with high fluorescence quantum yield and a narrow emission spectrum.

The ultrafine particles can be separated in terms of the approximate same particle size by successively depositing particles by centrifugation or the like in the order of decreasing particle size, utilizing the fact that larger ultrafine particles have lower solubility. During this process, since the solubility of the ultrafine particles is lowered by adding alcohol to the dispersion of ultrafine particles, gradually adding small quantities of alcohol to the dispersion makes it possible to successively deposit ultrafine particles in the order of decreasing particle size, thereby refining the ultrafine particles to have approximate particle sizes.

When the ultrafine particles thus refined are re-dispersed in water to yield a dispersion (or an aqueous solution), the refined ultrafine particles are imparted with a high fluorescence quantum yield. The dispersion as such is stable to some extent. However, the addition of a water-soluble compound containing a Group II element and a surfactant can improve the stability of the dispersion, thereby preventing the aggregation of particles, and maintaining a favorable fluorescence quantum yield. The type of Group II element compound, the concentration of the compound, the amount of the surfactant used, the pH of the dispersion, etc., (hereafter sometimes referred to as "preparation liquid") may be adjusted in the same ranges as those of the aqueous solution used for producing Group II-VI semiconductor ultrafine particles described above.

Specifically, as the preparation liquid, an aqueous solution with a pH ranging from about 10 to about 12, preferably about 10.5 to about 11.5 is suitable. More specifically, the aqueous solution comprises a water-soluble compound containing a Group II element as a starting material for Group II-VI semiconductor ultrafine particles (about 0.001 to about 0.05 mol/L, preferably about 0.01 to about 0.02 mol/L, and more preferably about 0.013 to about 0.018 mol/L) and a surfactant (about 0.5 to about 5 mols per mol of the Group II element contained in the aqueous solution, preferably about 1 to about 1.5 mols per mol of the Group II element).

An aqueous dispersion with the same composition as in the above-described preparation liquid is prepared by the following methods: the components of the water-soluble compound containing a Group II element, a surfactant, etc., shown here may be added directly to an aqueous dispersion in which the ultrafine particles are re-dispersed in water; an aqueous solution containing the water-soluble compound containing a Group II element and a surfactant is prepared beforehand, and the ultrafine particles are then added to the solution; or an aqueous solution containing the water-soluble compound containing a Group II element and a surfactant whose concentration is adjusted to a high level may be added to an aqueous dispersion in which the ultrafine particles are re-dispersed in water, yielding a preparation liquid with the concentration in the above range.

As described above, ultrafine particle dispersion can be obtained by refining the ultrafine particles in dispersion, re-dispersing the refined particles in water, adding to the resulting dispersion a water-soluble compound containing a Group-II element and a surfactant, and adjusting the pH of the dispersion to a desired level. When using this dispersion for producing a glass fluorescent material, a fluorescent material with a particularly high fluorescence quantum yield can be obtained by dispersing the ultrafine particles in a glass matrix by a process described later.

The semiconductor ultrafine particles obtained by the above process are excellent in terms of water dispersibility and fluorescence quantum yield, and moreover, the high fluorescence quantum yield can be maintained for a long period of time even in a water-containing solution in air. In particular, when ultrafine particles are dispersed in the above-described aqueous solution and the dispersion is held at 10° C. to 20° C. for 5 days in air, 50% or more fluorescence quantum yield of photoluminescence can be maintained.

Thus, when the ultrafine particles are dispersed in a glass matrix using a sol-gel method, the ultrafine particles can maintain good dispersibility and fluorescence performance during the process of forming glass from a metal alkoxide, thereby obtaining a fluorescent material with good performance.

Hereinafter, the process for dispersing the ultrafine particles in a glass matrix using a sol-gel method, and the fluorescent material obtained, are described.

Fluorescent Material in which Semiconductor Ultrafine Particles are Dispersed.

In the invention, a matrix in which the above-described semiconductor ultrafine particles are dispersed is a glass matrix formed by the sol-gel method. In this specification, usable as a sol-gel method is a known process in which a metal alkoxide in a liquid state is subjected to hydrolysis and then to condensation polymerization at near room temperature, thereby forming a glass-like solid matrix.

As described above, the semiconductor ultrafine particles of the invention have favorable water dispersibility and high fluorescence quantum yield, and moreover the high fluorescence quantum yield can be maintained for a long period of time even in a water-containing solution in air. Thus, when the ultrafine particles are dispersed in a glass matrix using a sol-gel method, the ultrafine particles can maintain good dispersibility and fluorescence performance during the formation of glass from a metal alkoxide, thereby obtaining a fluorescent material with good performance. The glass matrix that is formed is excellent in terms of its mechanical property, heat resistance, chemical stability, etc., and does not substantially deteriorate with time as compared with a polymer matrix, thereby yielding a high-performance fluorescent material with excellent durability.

In the invention, it is particularly preferable to use a series of compounds referred to as organoalkoxysilane as a metal alkoxide. This organoalkoxysilane is a compound which has a skeleton structure containing silicon and at least one of four bonds of silicon is bonded with a carbon atom, which is represented by General Formula: $X_n$—$Si(OR)_{4-n}$ ($n$=1, 2, or 3).

Examples of the functional group X are a group containing a vinyl group, a group containing an epoxy group, an amino alkyl group, an acryloyl alkyl group, a methacryloyl alkyl group, a mercapto alkyl group, a phenyl group, etc. As an alkoxy group (—OR), a methoxy group (—$OCH_3$), an ethoxy group (—$OC_2H_5$), an n-propoxy group, an isopropoxy group, etc., can be mentioned.

Among the compounds represented by Formula, $n$=1 is preferable.

As a group containing a vinyl group, a group shown by $CH_2$=$CH$—, $CH_2$=$CH$-Ph (Ph: a phenyl group) can be mentioned, for example.

Examples of a group containing an epoxy group include a group shown by CCO—$(CH_2)_k$—$OC_3H_6$— (CCO represents an epoxy group, and $k$ is an integer of 1 to 6), for example. Preferably, $k$ is 1 to 4, and more preferably $k$ is 1 or 2.

As an amino alkyl group, a group represented by $NH_2C_mH_{2m}$— ($m$ is an integer of 1 to 6) can be mentioned, for example. Preferably, $m$ is 2 to 4, and more preferably $m$ is 3. Among the above, a group represented by $H_2N(CH_2)_m$— ($m$ is an integer of 2 to 4) with a linear chain is preferable, and 3-aminopropyltrimethoxysilane (APS) is more preferable.

As an acryloylalkyl group, a group represented by $CH_2$=$C(CH_3)$ CO—O—$C_pH_{2p}$— ($p$ is an integer of 1 to 5) can be mentioned, for example. Preferably, $p$ is 2 to 4, and more preferably $p$ is 3.

Examples of a methacrylroylalkyl group include a group represented by $CH_2$=$CHCO$—O—$C_jH_{2j}$— ($j$ is an integer of 1 to 5), for example. Preferably, $j$ is 2 to 4, and more preferably $j$ is 3.

As a mercaptoalkyl group, a group represented by $HSC_qH_{2q}$— ($q$ is an integer of 1 to 10) can be mentioned, for example. Preferably, $q$ is 2 to 4, and more preferably $q$ is 3. Among the above, a group represented by $HS(CH_2)_q$— ($q$ is an integer of 2 to 4) with a linear chain is preferable, and mercaptopropyltrimethoxysilane (MPS) is more preferable.

In these compounds, while a glass network structure (—O—Si—)$_l$; $l$>1) is formed by a common sol-gel reaction such as hydrolysis of an alkoxy group and condensation polymerization, the functional group shown by X in the above formula is combined with the surface of the ultrafine particles, which stabilizes the ultrafine particles.

When using semiconductor ultrafine particles obtained using a surfactant with a thiol group and a carboxyl group, such as thioglycolic acid, it is preferable to use, as the organoalkoxysilane, trialkoxysilane with an amino alkyl group as a functional group. Specifically, a group shown by $H_2N(CH_2)_m$— ($m$ is an integer of 2 to 4) can be mentioned. In this case, since the affinity between the amino group of the organoalkoxysilane and the carboxyl group of the surfactant adsorbed to the surface of the semiconductor ultrafine particles is high, the dispersibility of the ultrafine particles can be increased.

It is also useful to add to the sol solution a water-soluble carbodiimide (WSC), such as 1-ethyl-3-(3-dimethylaminopropyl) carbodiimide hydrochloride, etc. Carbodiimide promotes dehydration condensation of the amino and carboxyl groups. The use of carbodiimide forms a chemical bond between the surfactant adsorbed to the surface of the ultrafine particles and the glass matrix, thereby further improving dispersibility of the particles. The amount of carbodiimide is preferably determined in such a manner as to have about 0.5 to about 8 times, preferably about 2 to about 4 times, the number of mols of the carboxyl group in the surfactant which was added as a component of the preparation liquid to the aqueous dispersion (aqueous solution) in which the refined ultrafine particles were re-dispersed in water.

A well-known process can be suitably applied to form a glass matrix using the above-described organoalkoxysilane by a sol-gel method. For example, a small amount of catalyst, such as hydrochloric acid, acetic acid, nitric acid, ammonia, etc., is added to the organoalkoxysilane; an alcohol compound, such as ethanol, methanol, propanol, butanol, etc.; and water (for example, about 1 mol of organoalkoxysilane to 1 to 60 mols of alcohol compound and 1 to 20 mols of water), to thereby prepare a sol solution. It should be noted that a sol-gel reaction proceeds with no catalyst by the use of the organoalkoxysilane containing an amino group, such as aminopropyltriethoxysilane. The above-described aqueous dispersion of the semiconductor ultrafine particles is added to this sol solution, and a hydrolysis and condensation polymerization reaction is carried out at about room temperature to about 100° C., thereby forming a glass matrix.

In order to increase the dispersibility of the semiconductor ultrafine particles, a surfactant may be added, if needed, to this sol solution in such a manner as to yield a concentration of about $10^{-5}$ to $10^{-3}$ mol/L. The pH of the sol solution is adjusted to about 9 to 10, and a reaction is carried out at about room temperature, thereby immobilizing the semiconductor ultrafine particles in glass. It is preferable to employ a surfactant which has both a hydrophilic group and a thiol group, such as thioglycerol, thioglycolic acid, and mercaptoethylamine, etc.

The amount of the aqueous dispersion of the semiconductor ultrafine particles to be added to the sol solution is preferably determined in such a manner as to yield a concentration of semiconductor ultrafine particles in the glass matrix of about $2\times10^{-6}$ to $2\times10^{-4}$ mol/L, preferably about $1\times10^{-5}$ to $2\times10^{-4}$ mol/L in the fluorescent material to be manufactured. A concentration within this range provides a fluorescent material with high luminance.

In this process, the concentration of ultrafine particles in the glass matrix can be estimated almost exactly by measuring the absorption spectrum (absorbance), as disclosed in a reference (Rajh, et al., *Journal of Physical Chemistry*, vol. 97, p. 11999, (1993)). Thus, since the absorption coefficient, $\in$, of the ultrafine particles of, for example, cadmium telluride, is about $4\times10^5$ L/mol·cm, the concentration, c (unit: mol/L) can be easily determined by the equation, $c=A/(L\times\in)$ if the absorbance A and thickness L (unit: cm) are determined.

For the purpose of increasing the crystallinity of the glass matrix, the dispersibility of the desired substance and hardness of the glass matrix, and reducing degradation, etc., other types of alkoxides, such as tetraalkoxysilane (tetramethoxysilane, tetraethoxysilane, tetraisopropoxysilane, etc.), tetraalkoxytitanium (titaniumtetraisopropoxide, etc.), trialkoxyaluminium (aluminumisopropoxide, etc.), etc., can be added to the above-described solution.

According to the process of the invention, during the production of a glass matrix, it is preferable to add a dispersion of semiconductor ultrafine particles to the sol solution after the sol-gel reaction is initiated and the viscosity of the sol solution has increased to reach a certain value after a predetermined time of period, rather than immediately after the reaction of the sol solution started. According to such a process, the ultrafine particles do not aggregate and are immediately dispersed uniformly in the solution to be immobilized in the glass matrix, thereby yielding a fluorescent material in which ultrafine particles are dispersed uniformly. Moreover, the degradation of the surface of the semiconductor ultrafine particles is minimized and no coagulation occurs even when the concentration of semiconductor ultrafine particle dispersion in the glass matrix reaches as high as about $2\times10^{-4}$ mol/L. Therefore, a fluorescent material containing semiconductor ultrafine particles exhibiting 20% or more fluorescence quantum yield in a glass matrix can be obtained. It is also possible to achieve a fluorescence quantum yield as high as 30% or more, and even 40% or more. In this case, in order to obtain favorable brightness, the distribution concentration of semiconductor ultrafine particles is preferably about $2\times10^{-6}$ mol/L to about $2\times10^{-4}$ mol/L, and more preferably about $1\times10^{-5}$ to about $2$ mol/L$\times10^{-4}$ mol/L.

In the above-described process, the viscosity of the sol solution at the time that semiconductor ultrafine particles are added varies depending on the amount of semiconductor ultrafine particles to be added, etc. The viscosity is not limited insofar as the ultrafine particles added do not coagulate and the homogeneity of the dispersion can be maintained. Generally, the viscosity of the sol solution may be about 300 to about 3000 centipoises, preferably about 300 to about 1500 centipoises, and more preferably about 700 to about 1200 centipoises. 1 centipoise is 1 millipascal second in the International System of Units.

According to the above-described process, the sol solution solidifies at room temperature in about one week, yielding a transparent glass fluorescent material without diffusion.

When adding semiconductor ultrafine particles to a solution wherein the viscosity of the solution increases in a predetermined period of time after the sol-gel reaction is initiated, the degradation of the semiconductor ultrafine particles dispersed in the glass matrix can be suppressed. Therefore, the fluorescent material of the invention, i.e., the fluorescent material obtained by dispersing semiconductor ultrafine particles in the glass matrix with 20% or more fluorescence quantum yield of photoluminescence can be manufactured using not only the semiconductor ultrafine particles capable of maintaining about 50% or more fluorescence quantum yield of photoluminescence when the particles are dispersed in water and held at 10° C. to 20° C. for five days, but also, for example, semiconductor ultrafine particles with about 30% of the fluorescence quantum yield of photoluminescence under the same conditions.

When a fluorescent glass obtained according to the above process is heated again at about 80° C. to 200° C. for about 0.5 to 5 hours, the glass network structure develops to thereby increases the hardness, yielding a high-quality glass. In this case, the hardness of the fluorescent material obtained varies according to the intended use, and has a Vickers hardness of about 20 or higher, preferably about 30 to about 200, and more preferably about 40 to about 100. The Vickers hardness denotes hardness determined based on the ratio of a load to the area of the indentation left in the surface of a test material when a diamond indenter in the form of a right pyramid with a square base (opposing angles of 136°) is used to indent the test sample, and is expressed by a unit of pressure. A Vickers hardness of 100 is 980 megapascals in the SI (International System of Units) unit of pressure.

In this specification, the "fluorescence quantum yield of the semiconductor ultrafine particles in fluorescent glass" denotes a ratio ($\Phi_{PL}/\Phi_A$) of the number of photons ($\Phi_{PL}$) emitted as photoluminescence from the ultrafine particles in the fluorescent glass to the number of photons ($\Phi_A$) of excitation light absorbed in the semiconductor ultrafine particles in the fluorescent glass. More specifically, a glass cell containing a dye molecule-containing solution with known absorbance and fluorescence quantum yield and a glass of a measurement target having the same thickness as the glass cell are used, and the absorbance and fluorescence quantum yield are compared between the dye molecule-containing solution and the measurement target, thereby determining the ratio.

The fluorescent material of the invention can be manufactured according to the above process. This fluorescent material can take any desired form according to the purpose of use. For example, a sol-state reaction solution in which semiconductor ultrafine particles are dispersed using a sol-gel method can be applied to a substrate, etc., by spin coat method, dip coat method, etc., thereby yielding a fluorescent-material thin film with a thickness of about 100 microns or less. Such a fluorescent material thin film can be used to adjust the color tone by the installation thereof on a mirror or a lens.

The fluorescent material of the invention manufactured according to the above-described process basically exhibits the properties of glass, and is excellent in many properties, such as mechanical, heat-resistance, chemical stability, etc. The semiconductor ultrafine particles contained in the fluorescent material also have excellent light resistance and favorable stability with the passage of time because the particles are isolated from the external atmosphere.

In particular, the fluorescent material of the invention has high stability with the passage of time. For example, the present invention provides a fluorescent material in which semiconductor ultrafine particles are dispersed in a glass matrix, and the particles are stable because a fluorescence quantum yield of photoluminescence thereof is decreased by 25% or less after the fluorescent material is maintained at room temperature in air for eight months. Furthermore, it is also possible to manufacture fluorescent materials containing ultrafine particles with a decrease rate of 20% or less, or 18% or less. In this specification, "room temperature" is about 10° C. to about 30° C., and a "percentage of decrease in the fluorescence quantum yield" denotes a percentage of decrease in the fluorescence quantum yield of the fluorescent material of the invention after eight months to the fluorescence quantum yield immediately after the production of the fluorescent material of the invention. Specifically, the measurement method follows the method of Example 11.

Fluorescent Material Applications

Since the fluorescent material obtained by the above process has high brightness and emits various colors of light under irradiation with a single-wavelength light, it can be effectively used in light-emitting devices, such as a lighting device, a display element, etc., in place of a conventional fluorescent material. Hereafter, an example of an application for the fluorescent material of the invention is described.

(1) Lighting Device

A lighting device employing the fluorescent material of the invention is provided with a light-emitting device comprising the fluorescent material and a light source which excites the fluorescent material.

The semiconductor ultrafine particles dispersed in the fluorescent material of the invention absorb all of the light that has a wavelength which is shorter than the band gap, and emit light equivalent to the energy of the band gap in the same fluorescence quantum yield, irrespective of the excitation light wavelength. Therefore, it is possible to design a lighting device in such a manner as to emit light of a desired wavelength by absorbing the light required for excitation with wavelengths ranging from 320 nm to 600 nm.

As a light source which excites this fluorescent material, a mercury lamp with a wavelength of 365 nm (correctly, a main wavelength of 365.08 nm, referred to as the "i-line of mercury") can be mentioned, for example. This mercury lamp emits a strong light, and thus is preferable. Examples of the lighting source include ultraviolet to a blue LED (wavelength: 370, 382, 455, 470 nm, etc.) using gallium nitride, indium gallium nitride and like, a blue-green to yellow LED (wavelength: 503, 505, 525, 590 nanometer, etc.), etc. Such lighting sources are inferior to a mercury lamp in strength, but they hardly give off any heat, and thus are suitable for preventing the degradation of ultrafine particles. Moreover, since they are commercially available very cheaply, they are quite useful for reducing costs.

A lighting device using such an excitation light source can be used as a common lighting device for providing light, a lighting device serving as the backlight of a liquid crystal, such as a cold-cathode fluorescent lamp, a light source for a liquid crystal projector for presentation purposes using a mercury lamp, etc. This fluorescent material can also be used as a laser medium. Moreover, the effect of further controlling the color tone can be achieved by allowing a red light-emitting ultrafine particles to absorb light of green, yellow, etc., given off from other ultrafine particles, and to emit light.

(2) Display Device

Display devices, such as a display panel, using the fluorescent material of the invention as a display element can be produced by forming a display element comprising the fluorescent material of the invention on a substrate and disposing an excitation light source in such a manner as to emit light to the display element while modulating its intensity according to an information signal. The excitation light source needs to have a light selected from lights with wavelengths where no matrix absorption occurs. Since a light with a wavelength of less than 320 nm is absorbed in many cases, a light source with a wavelength ranging from about 320 nm to about 600 nm, such as a mercury lamp, LED, a solid-state laser, etc., is preferable.

The use of ultraviolet light as an excitation light requires a display element which emits red, green, and blue lights. In contrast, however, when a blue light-emitting diode is used as the excitation light source, the excitation light can also serve as a blue emitted light. Therefore, all that is necessary is to form a display element that emits red and green lights.

It is preferable to form the display element as a spot of a minute region on the substrate. A favorable method for this formation is to spray onto the substrate a sol solution (glass precursor solution before solidification) for manufacturing the fluorescent material) from two or more nozzles in a manner similar to an inkjet printer as disclosed in Japanese Unexamined Patent Publication No. 2002-211935. In this case, for a high-precision display, it is preferable to form spots of minute regions with a diameter of 200 microns or less, and treating these minute regions as groups. As a sol solution usable in this case, a solution capable of being sprayed from a nozzle is mentioned among solutions for manufacturing the fluorescent material glass by the above-described sol-gel method. When such a solution is sprayed onto the substrate and the sol-gel reaction insufficiently advances, all that is necessary is to further promote the reaction. Subsequently, the glass precursor solution is, if necessary, heated at about 80° C. to about 200° C. for about 0.5 to about 5 hours to fully solidify it, thus producing a favorable display element.

Examples of the substrate include commonly used substrates, such as glass substrates, e.g., a quartz glass substrate, aborosilicate glass substrate, a soda-lime-glass substrate, etc.; polymer substrates, e.g., a polycarbonate substrate, a polymethylmethacrylate substrate, etc. Among the above, a glass substrate is preferable because a good adhesion with the fluorescent material can be achieved. Moreover, it is possible to attach a fluorescent material to a glass substrate, such as the outer or inner surface of a bulb or a fluorescent lamp, the surface of a light-reflector on an LCD projector, etc.

Usable methods for emitting light while modulating the intensity according to an information signal include a method of directly modulating the intensity of the excitation light source according to an information signal, a method of turning the light ON and OFF or modulating its intensity using a polarizer or liquid crystal molecules, etc. In the case of liquid crystal molecules, it may be usable to combine a polarizer with liquid crystals in which optical anisotropy and dielectric anisotropy are set to a desired level.

BEST MODE FOR CARRYING OUT THE INVENTION

Hereinafter, the present invention is described in detail with reference to Examples, but is not limited thereto.

Example 1

Group II-VI semiconductor cadmium telluride ultrafine particles were produced according to the following process obtained by improving the method described in Gao, et al., Journal of Physical Chemistry, B, vol. 102, p. 8360 (1998).

More specifically, in a Clean Room (10000 class or less), hydrogen telluride gas was added to an aqueous cadmium perchlorate solution (concentration of 0.013 mol/L) while vigoursly stirring in a round bottom flask charged with an argon gas, and the aqueous cadmium perchlorate solution has apH adjusted to 11.4 and comprises thioglycolic acid ($HOOCCH_2SH$) (TGA) as a surfactant. The resulting mixture was further stirred, yielding a dispersion of cadmium telluride ultrafine particles. The dispersion of ultrafine particles thus obtained emitted red light when irradiated by ultraviolet light. Ultrapure water (produced by a pure water producing machine, Milli-Q synthesis, manufactured by Nippon Millipore Corporation: Specific resistance; 18 MΩ·cm or higher, TOC (total organic carbon: total amount of organic compound(s) in water); 5 ppb) was used. The molar ratio of cadmium, tellurium, and thioglycolic acid in the ultrafine particle dispersion (precursor solution) was set as 1:0.47:X (X=0.90, 1.00, 1.25, 1.50, 1.75, or 2.43), and the variation in the fluorescence quantum yield of the ultrafine particles depending on the value of X was examined. The amount of the aqueous solution before the start of reaction was set to 60 cm³.

The value of the fluorescence quantum yield of the ultrafine particles was calculated in comparison with an aqueous sulfuric acid solution (sulfuric acid concentration: 1 mol/L) of a quinine molecule with known absorbance (absorption coefficient×concentration×optical path length) and known fluorescence quantum yield, according to a known process (Dawson, et al., Journal of Physical Chemistry, vol. 72, p. 3251 (1968)).

The results are shown in FIG. 1. FIG. 1 shows that ultrafine particles with 50% or higher of fluorescence quantum yield can be obtained when the concentration ratio of TGA to cadmium ions is within the range of 1 to 1.5. This may be due to the following reason: when the amount of surfactant is too small, the ultrafine particles aggregate and thus do not emit light. On the other hand, when the amount of surfactant is too large, defects on the surface of the ultrafine particles are increased, which causes increased radiationless deactivation, resulting in the decreased fluorescence quantum yield.

The change over time in the fluorescence of the solution thus produced was measured while it was contained in a small bottle with a small orifice in order to prevent any significant evaporation of water, and was allowed to stand at room temperature in air. As a result, the fluorescence intensity once increased over about three days, then decreased gradually to become comparable to the fluorescence quantum yield of semiconductor particles immediately after production in about five days, and finally the particles precipitated and did not emit light after eight days had passed.

Even when only a surfactant was put into water having a pH of 11.4 as the same above and allowed to stand in water, degradation of the surfactant advanced in the same time scale as above. Therefore, the deterioration of the ultrafine particles may be caused by insufficient combination and aggregation of the particles by Brown motion in a solution due to the degradation of the surfactant. The elevation in the fluorescence intensity can possibly be caused by a reduced number of defects on the surface because an SH group was liberated due to the decomposition of the surfactant, and the liberated SH group attached itself to the surface of the ultrafine particles.

According to a known reference (Talapin, et al., Journal of the American Chemical Society, vol. 124, p. 5782 (2002)), only particles emitting bright light were separated from this ultrafine particle dispersion by size-selective precipitation. Thereafter, when about 0.02 g of the extracted powder was re-dispersed in about 1 ml of water, the fluorescence quantum yield of the ultrafine particles in the dispersion was 70%. To the dispersion were added cadmium ions and a surfactant in approximately the same amount as the ingredients forming the original ultrafine particles (5.4 milligrams of cadmium perchlorate hexahydrate and 1.5 milligrams of thioglycolic acid), and sodium hydroxide was then added to the resultant dispersion to adjust the pH to about 11. Then, the surface appearance of the ultrafine particles was favorably maintained and the fluorescence quantum yield was maintained at 50% or higher for five days or more.

Example 2

3 g of aminopropyltrimethoxy silane and 28 g of methanol were sufficiently stirred, and 10 ml of the mixture was extracted and put into a petri dish made of a fluororesin with a diameter of 5 cm.

A small stirring bar was placed in this petri dish, and 2.8 ml of water was then put therein. The mixture was stirred while covering the dish from the top to prevent the entry of dust, and hydrolysis and subsequent dehydration condensation polymerization were allowed to proceed according to reaction formula.

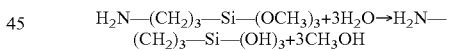

$H_2N-(CH_2)_3-Si-(OCH_3)_3+3H_2O \rightarrow H_2N-(CH_2)_3-Si-(OH)_3+3CH_3OH$

When the viscosity of the solution reached about 1000 centipoise after about 12 hours passed at a temperature of 23° C. and humidity of 60%, 1.2 ml of the dispersion of cadmium telluride ultrafine particles which emitted the red light of Example 1 (X=1.50, and immediately after production) was put in the solution, and the result was further stirred for 10 minutes, yielding a glass precursor solution. The viscosity of the solution was determined by measuring about 5 ml of the solution with an oscillation viscometer, Viscomate VM-1G, manufactured by CBC Materials Co., Ltd. Hereafter, unless otherwise specified, the viscosity was determined in the same manner.

The stirring bar was taken out from the obtained glass precursor solution, and the sol-gel reaction was advanced further. Seven days later, the solution had solidified completely, yielding transparent glass. At this time, the concentration of the ultrafine particles in the glass was about $1 \times 10^{-5}$ mol/L.

Figure 2:
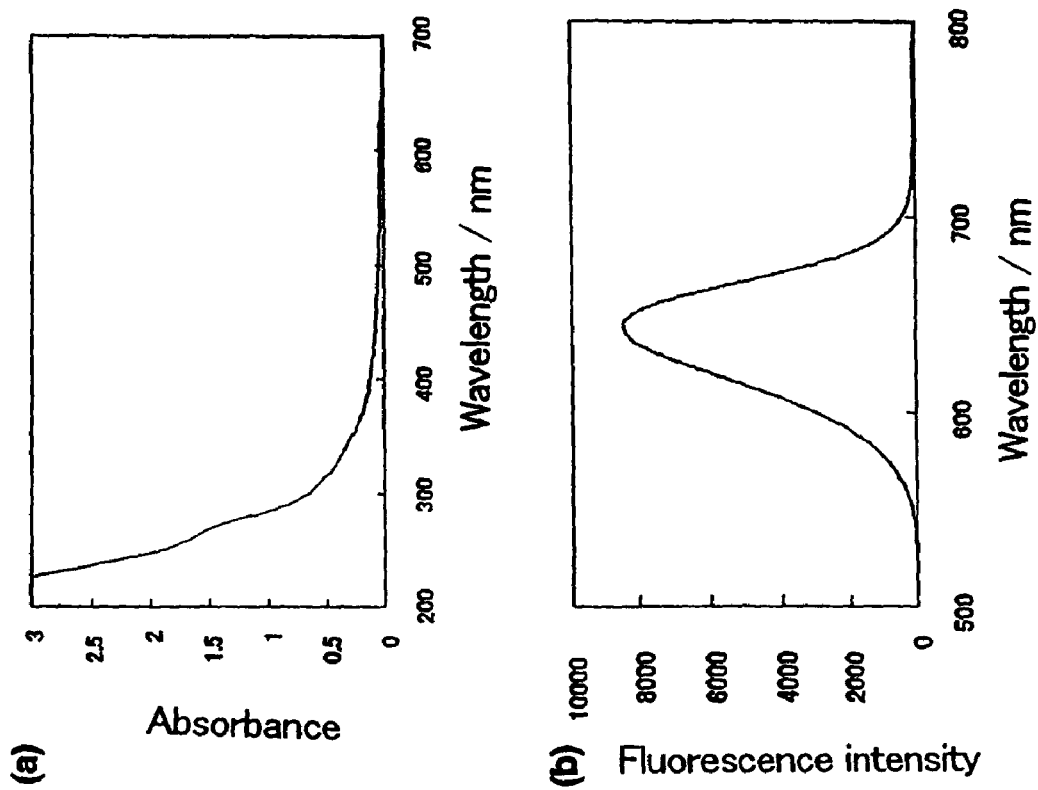
FIG. 2(a) is a diagram showing the absorption spectrum of the fluorescent material glass manufactured in Example 2.
FIG. 2(b) is a diagram showing the emission spectrum thereof.

FIG. 2 shows the measurement results of the optical absorption spectrum and emission spectrum of the glass (fluorescent material) in which the ultrafine particles were dispersed. The fluorescence quantum yield of the photoluminescence of the ultrafine particles dispersed in the glass was estimated to be 28% from this result.

Example 3

The glass of Example 2 was heated at 100° C. under an atmosphere of argon for two hours. At this time, the rate of the rise or drop in temperature was set to be 0.5° C./minute to prevent the formation of cracks in the glass. This heat treatment caused the weight to decrease by about 5%. The fluorescence quantum yield of the ultrafine particles in the glass of Example 2 was retained in the ultrafine particles in the obtained cured glass.

The hardness of the heat-treated glass was measured with a hardness tester (manufactured by Akashi, Microvickers Hardness Tester MVK-E), and a Vickers hardness of about 50 (490 megapascals in the International System of Units). Since the glass before the heat treatment was too soft and no indentation were formed, the hardness was not able to be measured. As described above, the heat treatment permitted the dehydration condensation reaction to proceed, thereby improving the quality of the glass.

It was determined that this heat treatment possibly grows glass particles, and slightly scatters the light.

Example 4

In Example 2, when the glass precursor solution in which the ultrafine particles were distributed was stirred, the viscosity once dropped. However, when the reaction advanced, the viscosity increased again. When the viscosity of this solution reached about 1000 centipoises, it was applied to the reflector of a high-pressure mercury lamp with a brush, the reflector with the solution was allowed to stand at room temperature overnight, and then the result was heated at 80° C. for two hours.

The reflector coated with a fluorescent material thin film containing the semiconductor ultrafine particles was able to efficiently convert ultraviolet light with a wavelength of 365 nm which was emitted from the high-pressure mercury lamp into red light. The fluorescent material glass was also able to simultaneously absorb light with wavelengths of 441, 547, and 570 nm which was contained in the light emitted from the light source, and to efficiently convert them into red light.

Since the fluorescence quantum yield of the fluorescent material used was high in this process, the efficient conversion to red light was possible.

Example 5

A borosilicate glass substrate which was etched by hydrofluoric acid to form grooves shaped like a character with a depth of about 0.5 mm was prepared. Then, when the viscosity of the glass precursor solution containing ultrafine particles in the middle of production in Example 2 reached about 700 centipoises, the solution was poured into the grooves. The result was allowed to stand at room temperature overnight, and was then heated at 60° C. for five hours, thereby promoting the sol-gel reaction. Thus, a fluorescent material glass that emitted light in the shape of a character was able to be formed on the glass substrate. This fluorescent material glass was firmly adhered to the glass substrate, and the adhesion to the glass substrate increased when the solution was poured in three stages.

Example 6

26 ml of the dispersion (x=1.50) of cadmium telluride ultrafine particles produced in Example 1 was prepared, and this was concentrated to the volume of 7 ml. When 0.9 ml of isopropanol was added to the condensed solution, followed by another addition of 0.1 ml of isopropanol, the ultrafine particles deposited to make the solution cloudy. The concentrated dispersion was subjected to a centrifugal separator at a rate of 3000 rotations/minute to completely precipitate the particles over five minutes, and the precipitate was extracted.

0.2 ml of isopropanol was added to a supernatant to precipitate the remaining ultrafine particles, and the precipitate was separated by centrifugation in the same manner as described above. The precipitate separated was washed with isopropanol, dried, and then immediately put in 2 ml of ultrapure water, yielding a monodispersion of the ultrafine particles. The absorption spectrum was measured to estimate the concentration of the ultrafine particles in this solution, which showed that the concentration was about 15 times that of the ultrafine particles immediately after production. In this process, the comparison of the concentration was conducted by comparing the absorbance (logarithm of the reciprocal of transmittance) at a specific wavelength.

The preparation liquid described below and water-soluble carbodiimide were admixed to the monodispersion of ultrafine particles described above, thereby preparing a dispersion of semiconductor ultrafine particles.

The preparation liquid had almost the same concentration as that of each material used at the initiation of ultrafine particle production, and, more specifically, it was composed of cadmium ions (0.013 mol/L) and TGA (0.020 mol/L) and the pH was adjusted to 11.4 by sodium hydroxide.

1-ethyl-3-(3-dimethylaminopropyl) carbodiimide hydrochloride ($C_2H_5$—N=C=N—$CH_2CH_2CH_2N(CH_3)_2$.HCl) (abbreviated as WSC) was used as the water-soluble carbodiimide.

These components were mixed in such a manner as to yield the ratio shown in Table 1, and the five types of ultrafine particle dispersions numbered 1 to 5 were prepared. Initially, the preparation liquid, WSC, and water were mixed, and finally a dispersion of the refined cadmium telluride ultrafine particles (concentration: about $1.9 \times 10^{-4}$ M) was added.

TABLE 1

Compositions of five dispersions of ultrafine particles and the concentration of the ultrafine particles in a glass fluorescent material manufactured therefrom

| | Composition of a dispersion of ultrafine particles | | | | Concentration of ultrafine |
|---|---|---|---|---|---|
| Number | Purified CdTe solution/mL (particle concentration: $1.9 \times 10^{-4}$M) | Preparation liquid/mL | Water/mL | WSC/g | particles in the produced glass fluorescent material/$10^{-5}$M |
| 1 | 0.053 | 0.5 | 0.45 | 0.0046 | 1 |
| 2 | 0.106 | 0.5 | 0.4 | 0.0092 | 2 |

TABLE 1-continued

Compositions of five dispersions of ultrafine particles and
the concentration of the ultrafine particles in a glass fluorescent
material manufactured therefrom

| | Composition of a dispersion of ultrafine particles | | | | Concentration of ultrafine |
|---|---|---|---|---|---|
| Number | Purified CdTe solution/mL (particle concentration: $1.9 \times 10^{-4}$M) | Preparation liquid/mL | Water/mL | WSC/g | particles in the produced glass fluorescent material/$10^{-5}$M |
| 3 | 0.265 | 0.5 | 0.235 | 0.023 | 5 |
| 4 | 0.5299 | 0.4 | 0.07 | 0.046 | 10 |
| 5 | 1.06 | 0.2 | 0 | 0.092 | 20 |

In contrast, 2 g of 3-aminopropyltrimethoxy silane and 18 g of methanol (about 0.02 mols of 3-aminopropyltrimethoxy silane per mol of methanol) were mixed and stirred, yielding a solution. 10 ml of the solution was extracted and put in a petri dish made of fluororesin with a diameter of 5 cm. 1 ml of water was then added thereto and the resulting mixture was stirred at room temperature of 14° C. and humidity of 45% for about 24 hours, thereby promoting hydrolysis and a dehydration condensation reaction, yielding a solution with a viscosity of about 1000 centipoises.

The solution in which the hydrolysis and the dehydration condensation reaction was promoted was poured into five petri dishes, and 1 ml of each of the five types of solutions shown in Table 1 was added to each petri dish. The mixtures were stirred for one minute each. Thereafter, the result was allowed to stand at the same room temperature and humidity for five days, and it had solidified to produce a glass fluorescent material.

A glass fluorescent material in which ultrafine particles with a minimum concentration of $1 \times 10^{-5}$ mol/L, and ultrafine particles with a maximum concentration of $2 \times 10^{-4}$ mol/L, as shown in the rightmost column of Table 1, were produced from each solution shown in Table 1. The fluorescence quantum yield of the ultrafine particles in this glass was 36%, 25%, 26%, 20%, and 21% in the order from top to bottom in Table 1. In other words, the fluorescence quantum yield of photoluminescence was 20% or higher. It should be noted that the wavelength of the excitation light at this time was 400 nm.

Moreover, according to the process, the addition of carbodiimide as a dehydration condensing agent achieved the formation of a chemical bond between the ultrafine particles and a glass matrix formed from 3-aminopropyltrimethoxy silane, which is a compound having an amino group, and such a chemical bond is effective for preventing the aggregation of ultrafine particles and protecting the surface condition.

According to the above-described process, not only a fluorescent material emitting red light, but also a fluorescent material emitting green light with 20% or higher of fluorescence quantum yield was obtained.

Example 7

The glass precursor solution containing ultrafine particles in the middle of production process in Example 2, which had a viscosity of about 350 centipoises, was used to produce a fluorescent material according to the process described in Example 3 of Japanese Unexamined Patent Publication No. 2002-211935. By heating a nozzle attached to a container of the glass precursor solution, fine drops of the glass precursor solution were ejected from the tip of the nozzle to the substrate, and the substrate was left at room temperature overnight. Subsequently, the substrate was heated at 100° C. for two hours to promote the sol-gel reaction, whereby a fluorescent material composed of a large number of minute regions each with a diameter of about 100 microns was produced on the substrate. Since the cadmium telluride ultrafine particles were able to emit red or green light depending on the particle diameter, the particles were able to be excited by multiple blue-light emitting LEDs (manufactured by Audio Q, wavelength of 470 nm), to obtain a light in desired colors.

Example 8

Figure 3:
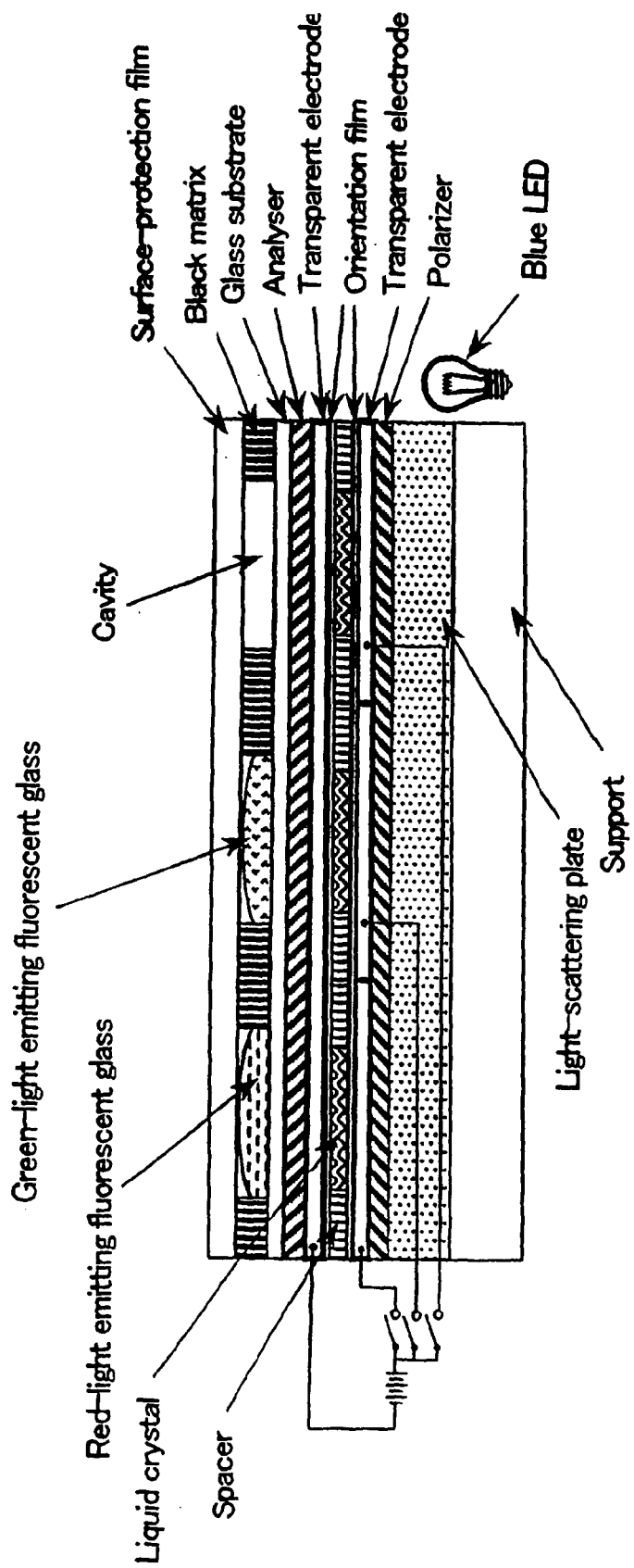
FIG. 3 is a view schematically illustrating a display device using the fluorescent material of the invention.

The display device shown in FIG. 3 was produced using a blue-light emitting LED as a light source.

This display device employed the same kind of system as applied to common liquid crystal displays, and had a light diffusing panel, a polarizer, a transparent electrode, a light alignment film, a liquid crystal cell, and an analyzer disposed on a support substrate, and a glass substrate to which the glass fluorescent material of the invention was adhered was disposed thereon. Between the glass fluorescent materials was disposed a black matrix for reducing light leakage, and a surface protection board was further disposed thereon.

The display device employs glass fluorescent materials, one which emits red light (610 nm) and another which emits green light (540 nm), and a portion coated with no grass fluorescent material (cavity) was able to emit blue light because the excitation light passed not being absorbed.

Figure 4:
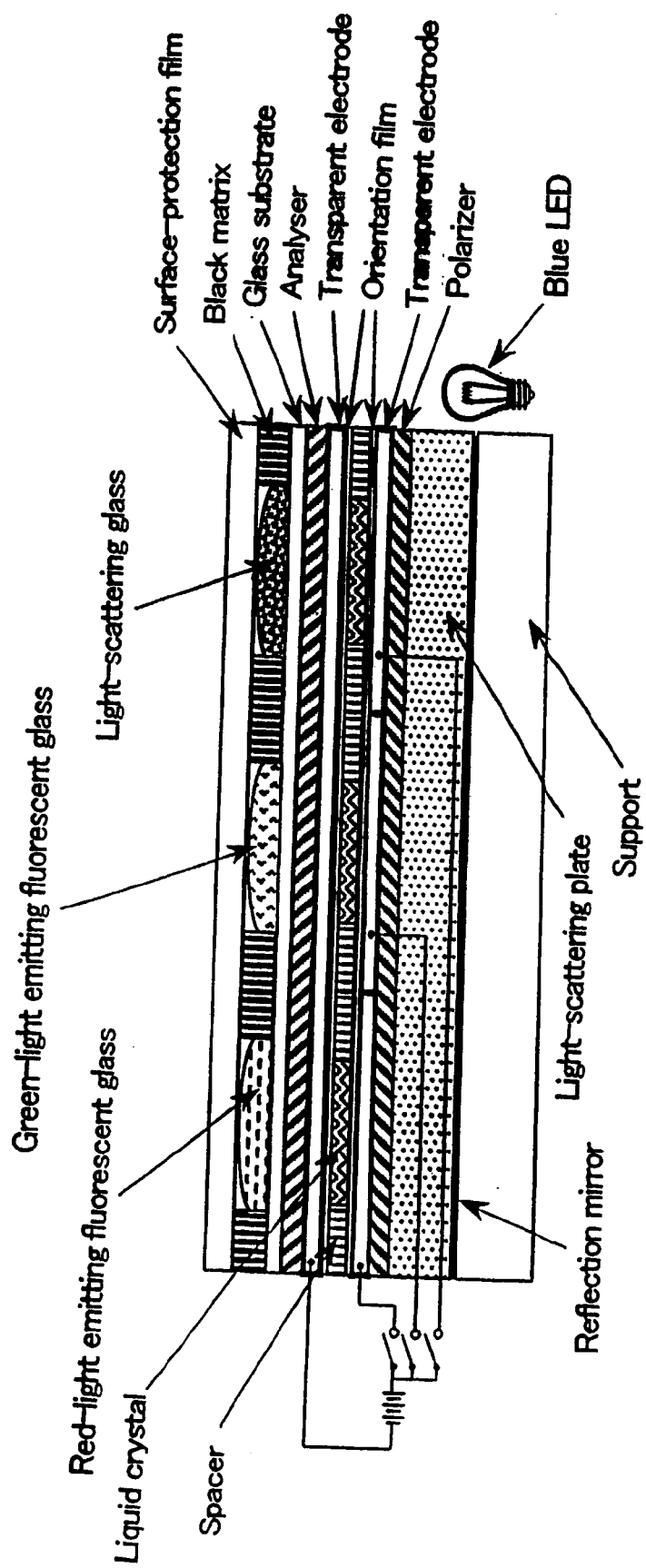
FIG. 4 is a view schematically illustrating another example of a display device using the fluorescent material of the invention.

As shown in FIG. 4, a diffusion of excitation light can be achieved by positioning glass in which silica-glass balls with a diameter of about 100 nm are distributed instead of the semiconductor ultrafine particles onto a cavity coated with no glass fluorescent materials. In the display device thus configured, the blue light traveled in the same manner as the red and green lights. In the display device of FIG. 4, providing a reflector on the support substrate allowed the excitation light and the fluorescent light emitted by the excitation light to efficiently travel toward the direction of the upper surface.

In the display devices shown in FIGS. 3 and 4, the orientation direction of each liquid crystal cell was controlled by changing the applied voltage according to an information signal, thereby changing the intensity of blue excitation light striking the fluorescent material glass. This made it possible to emit light with the desired color and gradation, thereby providing a high-performance color display device.

The current liquid crystal color display employs a combination of a white light source and red, green, and blue filters instead of the combination of a blue light source and fluorescent material glass of this Example. In this configuration, much of the light is absorbed, resulting in an energy loss. As compared with such a configuration, the device of Example 8 offers advantages in that the required color is directly obtained, resulting in favorable energy efficiency and light is emitted to all sides, resulting in a wide angle of visibility. Moreover, it is also possible to obtain blue light using cadmium selenide ultrafine particles by employing an ultraviolet LED as an excitation light source, instead of a blue light source.

Example 9

When the viscosity of the glass precursor solution containing the ultrafine particles in the middle of production process in Example 2 reached about 700 centipoises, the solution was dropped on the surface of a glass mirror and spin coating was carried out at about 500 rotations/minute. This provided a glass fluorescent material thin film about 1 micron thick. The temperature of the thin film was gradually elevated (at a rate of 0.5° C./minute) and was retained at 100° C. for two hours. The heated thin film was then cooled (at a rate of 0.5° C./minute), to produce a cured glass film. More solution was then applied to the cured glass film, and subjected to heat treatment, increasing the film thickness.

When the light of a high pressure mercury lamp was applied to the glass mirror thus obtained, part of the blue component was converted into red, thereby obtaining a warmer light.

Example 10

A dispersion of ultrafine particles comprising the components shown in the top column (number 1) of Table 1 of Example 6 was prepared. The scale of the experiment was enlarged so as to obtain a total amount of liquid three times that of the solution of No. 1. The pH of the solution was adjusted to 8, so that the water-soluble carbodiimide (WSC) was able to easily form an amide bond. In general, WSC is easy to form an amide bond at a pH of 4 to 8. When the viscosity of the sol solution, as measured using a vibration-type viscometer, had reached 1000 centipoises, the above-described dispersion of ultrafine particles was put in the sol solution and the mixture was stirred for one minute. Then, the mixture was allowed to stand indoors for five days, during which time it solidified, yielding a glass fluorescent material.

Figure 5:
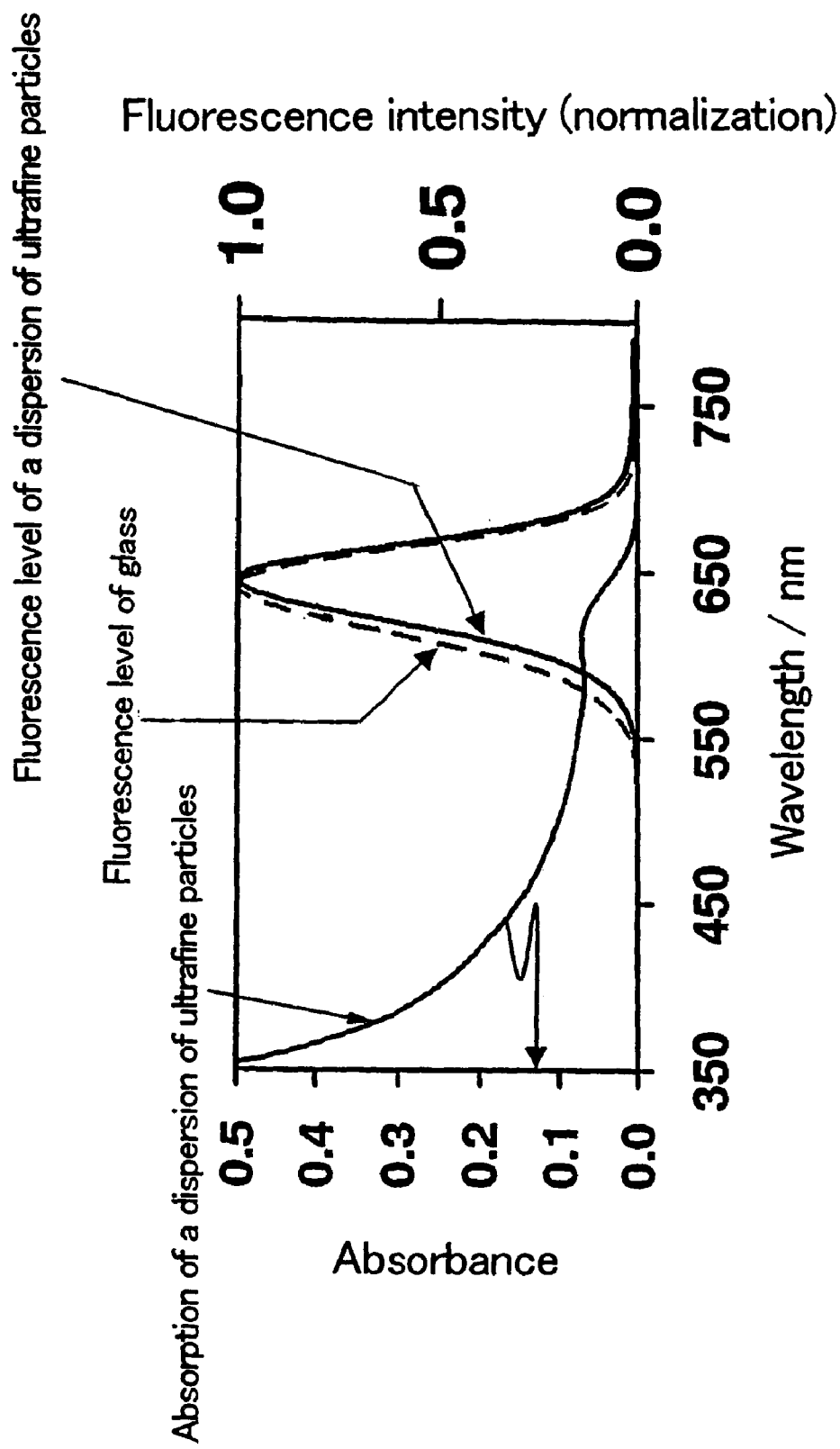
FIG. 5 is a diagram showing the emission spectrum of the fluorescent glass manufactured in Example 10, and the emission spectrum and absorption spectrum of ultrafine particles in a solution state.

FIG. 5 shows the measurement results of the fluorescent spectrum of the dispersion of ultrafine particles and the obtained glass. The absorption spectrum of the dispersion of ultrafine particles is also shown for reference. As can be seen from FIG. 5, since there was basically no difference found in the fluorescent spectrum between them, the surface appearance of the ultrafine particles after being distributed in a glass matrix was maintained in almost the same state as that of the ultrafine particles in the solution. This showed that the fluorescence quantum yield hardly changed even when the ultrafine particles were put into glass, and actually, 43% of the fluorescence quantum yield was obtained when the glass was excited by light with a wavelength of 365 nm. Since the surface appearance of the ultrafine particles was maintained, the high dispersibility of the ultrafine particles was also preserved.

Example 11

Glass fluorescent material in which ultrafine particles were dispersed was produced in the same manner as in Example 10, and it was found that the fluorescence quantum yield of the ultrafine particles in the fluorescent material was 39%. The peak wavelength of the emission light was 644.0 nm, and the full width at half maximum of the emission spectrum was 57.8 nm. This glass fluorescent material was allowed to stand indoors (about 10° C. to 20° C.) for eight months, and was measured by the same process, which showed that the fluorescence quantum yield was 32%, the peak wavelength of the emission light was 644.5 nm, and the full width at half maximum of the emission light was 58.6 nm. In other words, the percentage of decrease of the fluorescence quantum yield was 18%.

When the ultrafine particles were left in the form of an aqueous solution at room temperature in air for several weeks, the particles deteriorated and hardly emitted light. However, as can be seen from the above, the properties thereof can be maintained for a long time when the particles are stabilized in glass.

The disclosures of the documents cited in the detailed description of the invention in the present specification are incorporated herein by reference.

Effect of the Invention

The semiconductor ultrafine particles of the invention have excellent properties: favorable water dispersibility, high fluorescence quantum yield, and the ability to maintain the high fluorescence quantum yield in a water-containing aqueous solution in air for a long period of time.

Accordingly, when the semiconductor ultrafine particles are dispersed in a glass matrix using a sol-gel method, the good dispersibility and fluorescent ability of the ultrafine particles can be maintained during the formation of glass from a metal alkoxide, thereby obtaining a fluorescent material imparted with outstanding properties. In particular, according to a process wherein the semiconductor ultrafine particles are added to a metal alkoxide solution after the sol-gel reaction initiates and the viscosity of the solution increases after a given period of time, it is possible to provide a fluorescent material with a high fluorescence ability in which the semiconductor ultrafine particles are dispersed in a high concentration while maintaining high fluorescence quantum yield.

The fluorescent material obtained thus basically exhibits the properties of glass, and has excellent mechanical properties, heat resistance, chemical stabilities, etc. Moreover, since the semiconductor ultrafine particles are isolated from the external atmosphere, they have favorable light resistance and extremely excellent stability with the passage of time. The fluorescent material has high brightness, and emits various colors of light under irradiation by light with a single wavelength, and thus can be efficiently used for various applications, such as a lighting device, a display element, etc., in place of conventional fluorescent materials.

The invention claimed is:

1. A fluorescent material comprising semiconductor ultrafine particles having 20% or more fluorescence quantum yield of photoluminescence dispersed in a glass matrix formed by a sol-gel process using an organoalkoxysilane represented by General Formula:

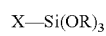

wherein X is a group containing a vinyl group, a group containing an epoxy group, an amino alkyl group, an acryloyl alkyl group, a methacryloyl alkyl group, a mercapto alkyl group or a phenyl group, OR is an alkoxy group, and group X is bonded to Si through a silicon-carbon bond, wherein a surfactant selected from the group consisting of thioglycolic acid, thioglycerol and mercaptoethylamine is adsorbed to the surface of the semiconductor ultrafine particles.

2. A fluorescent material according to claim 1, wherein a concentration of semiconductor ultrafine particles in the glass matrix is $2 \times 10^{-6}$ to $2 \times 10^{-4}$ mol/L.

3. A light emitting device comprising:
   a light emitter composed of a fluorescent material according to claim 1; and
   a light source which emits excitation light with a wavelength of 320 nm to 600 nm for exciting the fluorescent material.

4. A fluorescent material according to claim 1, wherein the alkoxy group is a methoxy group, ethoxy group, n-propoxy group or isopropoxy group.

5. A fluorescent material according to claim 1, which has a Vickers hardness of about 20 or higher.

6. A fluorescent material according to claim 1, wherein the semiconductor ultrafine particles belong to the Group II-VI semiconductor ultrafine particles.

7. A fluorescent material according to claim 1, wherein the semiconductor ultrafine particles are cadmium telluride.

8. A fluorescent material according to claim 1, wherein:
the group containing a vinyl group is a group shown by $CH_2$=CH— or $CH_2$=CH-Ph (Ph: a phenyl group);
the group containing an epoxy group is a group shown by CCO—$(CH_2)_k$—$OC_3H_6$—(CCO represents an epoxy group, and k is an integer of 1 to 6);
the amino alkyl group is a group represented by $NH_2C_mH_{2m}$ (m is an integer of 1 to 6);
the acryloyl alkyl group is a group represented by $CH_2$=C$(CH_3)$CO—O—$C_pH_{2p}$— (p is an integer of 1 to 5);
the methacryloyl alkyl group is a group represented by $CH_2$=CHCO—O—$C_jH_{2j}$— (j is an integer of 1 to 5); and
the mercapto alkyl group represented by $HSC_qH_{2q}$— (q is an integer of 1 to 10).

* * * * *